United States Patent [19]

Zscheile, Jr.

[11] 4,418,393
[45] Nov. 29, 1983

[54] MATCHED FILTER SPREAD SPECTRUM CODE RECOVERY APPARATUS

[75] Inventor: John W. Zscheile, Jr., Murray, Utah

[73] Assignee: Sperry Corporation, New York, N.Y.

[21] Appl. No.: 200,827

[22] Filed: Oct. 27, 1980

[51] Int. Cl.³ ............................................. G06F 15/31
[52] U.S. Cl. ........................................ 364/724; 375/1
[58] Field of Search .................... 364/724, 825; 375/1

[56] References Cited

U.S. PATENT DOCUMENTS

| 4,234,930 | 11/1980 | Campbell | 364/724 |
| 4,288,750 | 9/1981 | Newton et al. | 364/825 X |
| 4,291,410 | 9/1981 | Caples et al. | 375/1 |

OTHER PUBLICATIONS

Grant et al. "Synchronization, Acquisition & Data Transfer Utilizing a Programmable Surface-Acoustic-Wave Analogue Matched Filter" *Electronic Letters* vol. 8, No. 12, Jun. 15, 1972, pp. 299-301.

Hagon et al. "Integrated Programmable Analog Matched Filters for Spread Spectrum Applications" *Ultra-sonics Symposium Proceedings IEEE*, Nov. 1973, pp. 333-335.

Primary Examiner—David H. Malzahn
Attorney, Agent, or Firm—John B. Sowell; Kenneth T. Grace; Marshall M. Truex

[57] ABSTRACT

Apparatus is provided for decreasing the acquisition time for recovering spread spectrum codes. The transmitted spread spectrum code is preceeded by a sync signal to establish system time at the receiver. The received coded data signals are applied to a matched filter or a delay line such as a surface acoustic wave device. The number of chips in the delay line is made an integral fraction of the number of chips in the word to be detected. The signals stored in the delay line are detected chip by chip as the coded data passes through the delay line. The resultant output analog signals from the delay line is digitized and stored chip by chip in a digital memory, such as a shift register, having the same chip storage capacity as the sequence group being transmitted. The values of chips in the digital storage memory are recirculated back to the input of an adder. A new value for the same chip of the word is generated as new digitized output in the delay line device, and is added in the adder to the value recirculated from the storage memory. In this manner, the peak outputs from the delay line, which are occurring at a unique or particular chip position, are enhanced so that the unique chip position in the coded data word is identified.

8 Claims, 6 Drawing Figures

MATCHED FILTER SPREAD SPECTRUM CODE RECOVERY APPARATUS

BACKGROUND OF THE INVENTION

1. Field of the Invention

This invention relates to jam resistant command and control data links. More particularly, the apparatus and system are employed to decrease the acquisition time for data links which employ spread spectrum codes.

2. Description of the Prior Art

Heretofore, different methods have been discussed for providing jam resistant control data links. A method of providing jam resistant transmission of data is to employ spread spectrum coding of the data to be transmitted. One such method of avoiding jamming is to employ direct sequence modulation, wherein a binary code with noise-like qualities is modulated on to a carrier. The most desirable selection of a secure code requires a long sequence and a long sequence requires long acquisition time.

The demodulation of the incoming modulated waveform is dependant on having a replica of the sequence being transmitted which is in phase with the incoming sequence. The reason acquisition time is lengthy is that the incoming sequence must be phase searched until correlation is attained. Phase searching extends acquisition time and has heretofore been a drawback in the use of desirable spread spectrum codes.

The process of phase searching can be speeded up using tapped delay lines or matched filters, but this greatly increases the cost and the complexity of the decoding equipment. It has been suggested that the matched filtering can be performed at high data rates with surface acoustic wave devices (SAWs). It has been suggested that a plurality of SAWs be provided, one for each sequence group of signals representative of a symbol being transmitted. If all such SAWs receive the incoming signals simultaneously, then the output of the SAWs could be compared in a complex computer system and the SAW with the greatest output voltage would be indicative of the symbol or signal being transmitted. Numerous problems arise from using the same number of matched filters as there are symbols being transmitted. Since a practical SAW is presently only capable of storing ten to twenty microseconds of waveform signal, there are limitations to the data rate of transmission. When SAWs are employed in low data rate systems, they are only capable of collecting a portion of the signal energy defining the data bit being transmitted. For example, when data is being transmitted at 4.88 kilobits per second, the time for one bit is 205 microseconds. The SAW is only capable of utilizing or collecting ten to twenty microseconds of the available energy of this bit. Thus, the SAW is only recovering one tenth to one twentieth of the available signal energy. It is not practical to connect SAWs in series because the attenuation factor is so great that the efficient recovery of energy is not possible. Signal attenuation limits a practical SAW to a time length of about fifteen microseconds. However, it will be understood that conventional tapped delay lines could be employed to create delays greater than fifteen microseconds by using semi-conductor devices such as integrated circuits and/or charged coupled devices. Semiconductor delays would require more complex devices than those accomplished with a SAW. Inductive delays are not considered to be practical or accurate enough for consideration.

In order to overcome high energy jamming, which is partially effective against spread spectrum codes, it is most desirable to collect all of the energy available at the receiver. The equivalent of collecting only ten to fifteen percent of the energy available is to effectively increase the efficiency of the jammer by a factor of seven to ten.

Typical data rates for controlling a single remote piloted vehicle (RPV) are two hundred bits per second so that the data rate to control twenty RPVs from a single master station would be on the order of four thousand bits per second. A data rate of four thousand bits per second is equivalent to a bit time of two hundred and fifty microseconds, thus, the SAW device of the prior art would only recover a small portion of the energy transmitted and would permit the jammers to be more effective. In order to employ real time control with a plurality of RPVs, when employing spread spectrum codes, the code stream must be reacquired each time a new RPV is addressed. Reacquisition time could be extremely lengthy and difficult when using the prior art methods of sequential scanning.

It would be extremely desirable to employ a surface acoustic wave device in a spread spectrum code recovery system for RPVs which would permit rapid reacquisition of the signal with little or no loss of energy.

SUMMARY OF THE INVENTION

It is a principal object of the present invention to provide an improved signal recovery system for spread spectrum codes.

It is another principal object of the present invention to provide a spread spectrum code recovery system requiring less acquisition time.

It is another principal object of the present invention to provide an improved signal recovery system employing a single surface acoustic wave device to decode and recover a plurality of spread spectrum code sequence groups.

It is another object of the present invention to provide a spread spectrum code recovery system employing a surface acoustic wave device for recovering the full transmitted signal energy without a processing gain loss.

It is another object of the present invention to provide a spread spectrum recovery system employing a surface acoustic wave device in which the chip length of the SAW is less than the chip length of the data bit being recovered.

It is yet another object of the present invention to provide a simple, cheap and reliable data recovery system employing a spread spectrum coded sync signal for fast reacquisition.

According to these and other objects of the present invention, there is provided an improved apparatus for receiving spread spectrum coded data. The received coded data signals are applied to a surface acoustic wave device which serves as a tapped delay line for receiving a sequence group representative of a data word. The output of the surface acoustic wave device is detected at each chip time and the output stored in a shift register device. The sequence group being received is transmitted a plurality of times and detected by the same surface acoustic wave device and the output stored at each chip time in the shift register device after being added to the previously stored digitial value detected at the same chip time of the previous sequence groups. Logic means are coupled to the output of the shift register for detecting the chip time having the greatest digital value which is representative of a unique data word being transmitted.

BRIEF DESCRIPTION OF THE DRAWINGS

FIGS. 3A to 3C, are schematic diagrams showing the time relationship between a sequence group, a data bit and a data word.

DESCRIPTION OF THE PREFERRED EMBODIMENT

Figure 1:
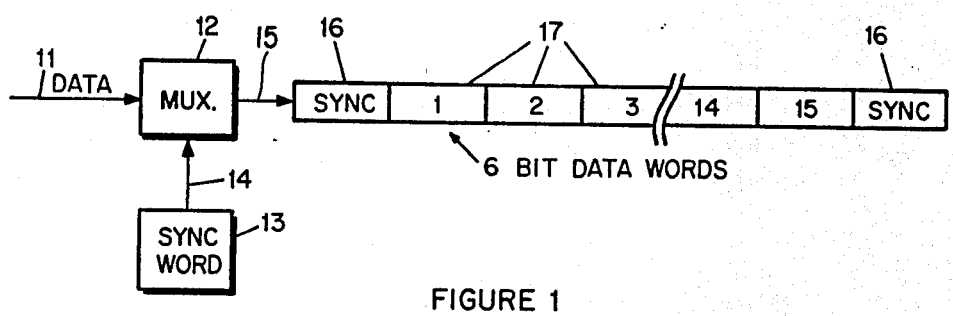
FIG. 1 is a block and schematic diagram showing the generation and insertion of the sync word into a data stream at the transmitter.

Refer now to FIG. 1 employed to illustrate the coded data words being generated before they are transmitted from the ground station.

The data stream on line 11 is applied to a multiplexer 12 and a sync word generator 13 applies a sync word on line 14 to multiplexer 12. The output on line 15 from multiplexer 12 is a six bit sync word 16 followed by fifteen six bit data words 17.

Figure 2:
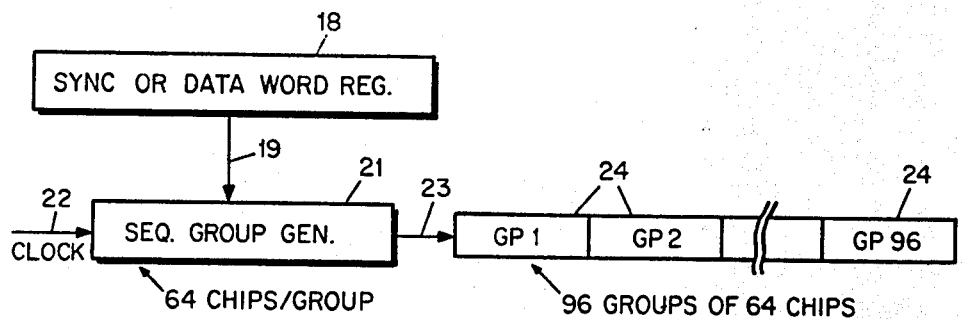
FIG. 2 is a block and schematic diagram showing the generation of a sequence group of chips representative of a sync or data word.

FIG. 2 is employed to show the generation of a spread spectrum coded sequence of chips representative of a six bit sync word 16 or data word 17. Register 18 contains the six bit binary coded word which is presented on initiation line 19 to the spread spectrum code group generator 21. The generator 21 is driven by a clock signal on line 22 to produce a waveform on output line 23 in a modulated form for transmission to the receiving system which will be explained hereinafter with regards to FIG. 4.

The six bit word in register 18 may be any one of sixty-four binary combinations. One of the sixty-four binary words is predetermined to be a unique sync word and is employed to be representative of the sync signal, otherwise, it has no special coding significance.

Each sync or data word in register 18 is transmitted as a group sequence of sixty-four chips and is preferably transmitted ninety-six times. It will be understood that the limited number of bits in a data word and the number of chips in a sequence group has been selected for purposes of illustration only. The six bit word is used to better explain the advantages of the system which is not limited to a particular binary link of data words or chips in a sequence group.

Figure 3:
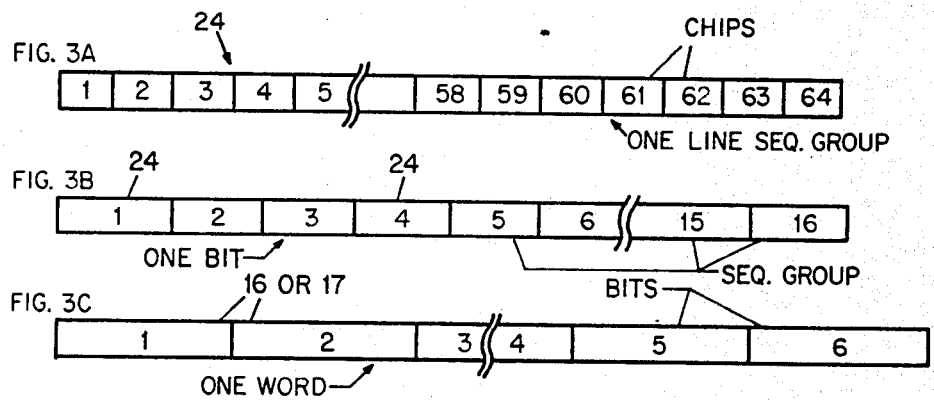
FIG. 3, comprising

The sequence group 24 of sixty-four chips is illustrated in FIGS. 2 and 3A. The order of the sixty-four chips in the sequence group 24 is indicative of one of the sixty-four unique six bit words. If the data word on line 15 is being generated at 4.88 kilobits per second, then the group sequence rate on line 23 is being generated at 78 kilogroups per second and the time length of a sequence group is 12.8 microseconds per group. Thus, the sequence group length is timed compatible with the presently available surface acoustic wave devices.

FIG. 3B shows sixteen sequence groups 24, the total of which is representative of signal information employed to transmit one sync or one data bit. Since there are six bits for each sync or data word, as shown in FIG. 3C, the total number of sequence groups required to transmit a sync or data word is six times sixteen or ninety-six. Thus, the sequence group generator 21 transmits the same sequence group ninety-six times for each word in generator 18.

Figure 4:
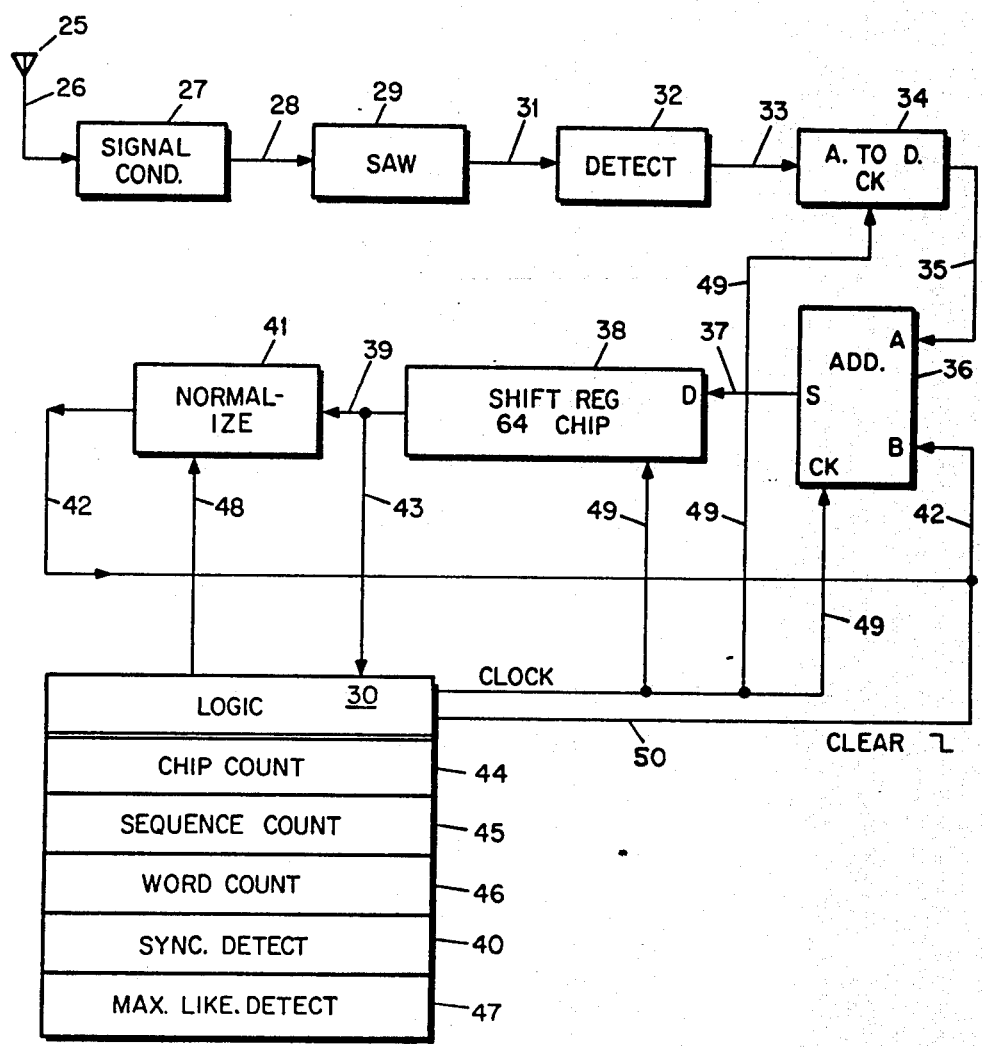
FIG. 4 is a block diagram of the novel receiving system employing a single tap delay line or SAW for recovering spread spectrum coded data without a processing gain loss.

Refer now to FIG. 4 showing the receiving antenna 25 for receiving the aforementioned spread spectrum coded information in the form of sequence groups 24 being transmitted ninety-six times each. Assume that the receiving system 20 is installed in one of a plurality of remote piloted vehicles (RPVs). As soon as a sync word is transmitted, the RPVs receiver is locked on or has required the system time. If the attempt to acquire occurs before or during transmission of a complete sync word, the system 20 will lock on to the next following sync word 16 occurring twenty milliseconds later, thus, the average acquisition time is only ten milliseconds.

The signal received at antenna 25 is conducted via line 26 to the signal conditioning logic 27, which is employed to optimize the amplitude of the incoming signal for correct level input to the surface acoustic wave device 29 via line 28. Signal conditioning element 27 also translates the carrier frequency into a matched frequency for input to the SAW. At each chip time, the output of the SAW device 29 is continuously available on output line 31 to the input of envelope detector 32. The output of envelope detector 32 is a continuous voltage analog signal on line 33 being applied to the analog to digital converter 34. The analog to digital converter 34 is clocked by a clock signal from logic 30. Thus, at each chip time there is presented on parallel output line 35, a digital value representative of the analog voltage detected by the envelope detector 32. The digital value on line 35 is applied to the A (or one of the) inputs of a summing circuit or adder 36, which is also clocked by the clock signal from logic 30. Accordingly, each chip time there is being presented at the sum or output line 37 of adder 36 a digital value representative of the digital value at the A input of adder 36 added to the B input of adder 36. The digital value on adder output line 37 is applied as the data input to a shift register means 38 having the same number of storage positions or chip positions as the SAW 29. The digital value on line 37 is applied at the least significant order value and is clocked each time to the left until the input signal is clocked out on shift register output line 39 sixty-four times later. The digital value output on line 39 is circulated through a normalizer 41 which will be explained with more particularity hereinafter. The output of normalizer 41 is recirculated via line 42 back to the B input of adder 36. In the preferred embodiment system 20, the digital value on line 35, representative of chip time two, is arriving at the A input of adder 36 at the same time the recirculated value from shift register 38 representative of chip two is being applied to the B input. Accordingly, it will be understood that if the chip time representative of the word being transmitted occurs on line 35, the output signal will be relatively large accompanied by some noise. As each of the ninety-six sequence groups is circulated through the adder 36, one of the significant or unique chip times will have a larger output than the other corresponding chip times. As each sequence group is circulated through the shift register 38 and circulated back to the B input of adder 36, the output on line 35 plus the output on input line 42 will be accumulated and the random background noise will substantially cancel out or not accumulate.

At the chip times, which do not contain the higher output or unique chip position digital value representative of the word being transmitted, the background noise digital values will also accumulate at a slower rate than the unique chip value rate so that there is background noise present. To contain the background noise in the range of the ability of the shift register to record binary information, a normalizer 41 is provided. The normalizer is controlled by logic 30 via line 48 to effectively reduce the reference scale of the waveform recorded in the chip register 38. Such devices are well known and do not require additional explanation here.

The output of shift register 38 is being applied to logic 30 via input line 43. At a predetermined time, the output of the shift register 38 is applied to a maximum likelyhood detector 47 to determine the chip position which has the highest value or the unique value representative of the word being transmitted. When the transmitted word is a sync word 16, logic 30 resets or starts the chip counter 44, the sequence counter 45 and the word counter 46. Thus, logic 30 has acquired a system time for receiving data word 17. After a data word is transmitted through shift register 38, for the ninety-sixth time, the data word can be applied to the maximum likelyhood detector 47 to determine the unique chip position representative of the data word being transmitted. It will be understood that the maximum likelyhood detector is capable of storing the count of the digital value of the bins in the shift register as the digital values are presented on output line 43. As the next higher or highest digital value is presented to the logic 30, the maximum likelyhood detector records the chip count or chip position where this output occurs, thus, recording the unique chip position representative of the data word being transmitted. The highest output chip position or chip count is the data word being transmitted.

When the sequence counter 45 reaches the count of ninety-six, the last sequence group of a transmitted data word is being transmitted through shift register 38. Logic 30 produces a zero or clear signal on line 50 at the input of adder 36 during this last sequence group so that the adder will be adding the A input to zero as the new sequence group is first being presented to the adder 36. Stated differently, the next following sequence group being presented on line 35 passes through adder 36 to shift register 38 without being altered.

Every sixteen words, the sync word is being transmitted and is detected at sync detector 40. The internal clock in logic 30 is resynced and the chip counter 44, sequence group counter 45 and word counter 46 are reset. The clock signal on line 49 is sufficiently stable to maintain the synchronization of the chip count until the next sync signal is transmitted.

It will now be understood that the novel repetative transmission of the sequence groups 24 has enabled the receiving system 20 to accumulate all of the energy being transmitted, thus, reducing the effect of jamming to a minimum.

Further, the repetative transmission of the sync words 16 assures that the resynchronization and reacquisition of the system is established within a sync word time, thus, no data is lost.

It is well known that the jamming power is reduced or attenuated by a factor equal to the chip rate divided by the bit rate (CR/BR). The factor CR/BR is equal to CR times the bit time, thus, as bit time is increased, as in the present invention, the jamming power is essentia reduced.

When it is required to control a plurality of differ RPVs, the only required change to the system 10 is t a different surface acoustic wave device be employec each RPV. If programmable SAWs are employed, code of the SAW may be changed in flight or o1 moments notice, by logic programming. While tapp delay lines can be employed, the preferred embodim SAW devices have distinct advantages.

Having explained a preferred embodiment of present invention, it will be obvious to those skilled the art that a single SAW device may be employed achieve results heretofore only obtainable with a v large number of SAWs and a more complex compu arithmetic logic.

The prior art parallel search technique, which e ployed a plurality of SAWs, cannot be employed i1 system adapted for controlling remote piloted vehic in a jamming environment because the received sign are very weak. The present invention also receive weak signal, but by repetitive detection of a repetitiv transmitted signal, the detected signal is built up to level equivalent to the recovery of all of the energy the transmitter signal.

I claim:

1. Apparatus for receiving and decoding a transn ted coded message where the coded message is a moc lated signal comprising a multibit data word convert into a spread spectrum code having a unique sequer of chips preceded by a sync signal and where the unic sequence of chips define a plurality of identical quence groups each representative of said multibit d word, the combination comprising:

means for receiving said sync signal and said .quence groups of chips, means for processing said sync signal and said grot of chips coupled to said receiving means to provi a time base signal and processed chips, a tapped delay line device coupled to said sync sig1 and said processed chips, said tapped delay li device having a chip length sufficient to accomn date one sequence group, means for detecting the output of said tapped del line device at each chip time, means for converting the detected output of s; tapped delay line device to a digital value at ea chip time, shift register means coupled to said converting mea being adapted to store said digital values at ea chip time in the order of detection, logic means comprising a plurality of counters a maximum value detector means, said logic means being coupled to the output of s; shift register means for detecting said sync sig1 and starting said plurality of counters, one of said counters being adapted to keep a sequen group count and another of said counters bei adapted to keep a chip position count as said digi values are shifted through said shift register mea adder means connected to said converting means a to said shift register means for summing the digi value of the output of said device at each chip til with the digital value stored in said shift regist means representative of the same chip time of t previously detected sequence group, and said maximum value detector means in said log means coupled to the output of said shift regist means for detecting the chip position in said sequence group having the largest digital value stored in said shift register means, whereby the largest digital value chip position in said sequence group is indicative of a unique multibit data word.

2. Apparatus as set forth in claim 1 wherein said tapped delay line device comprises a surface acoustic wave device.

3. Apparatus as set forth in claim 2 wherein the number of chips in said surface acoustic wave device is less than the number of chips in said multibit data word being detected.

4. Apparatus as set forth in claim 2 wherein said sequence group counter in said logic means is adapted to detect said plurality of identical sequence groups and to couple the output of said shift register means to said maximum value detector means during the output of the last sequence group of said plurality of identical sequence groups from said shift register.

5. Apparatus as set forth in claim 2 wherein the digital values stored in said shift register means are recirculated through said adder means at a chip position which is synchronized with the output of said surface acoustic wave device, clock means in said logic means connected to said adder means and said shift register means for synchronizing the input to said adder means, whereby recirculated digital values stored in said shift register means are increased at a unique chip position each time said shift register means are recirculated through said adder means.

6. Apparatus as set forth in claim 5 which further includes normalizing means connected between said shift register and said adder means for normalizing the build up of the digital value in said one unique chip position.

7. A method of receiving and enhancing a unique multibit data word converted into spread spectrum code form, comprising the steps of:

receiving a sync signal preceding said sequence of chips and starting a sequence group count and a chip count, receiving and demodulating a plurality of unique sequence of chips representative of said multibit data word, processing said sync signal and chips in a surface acoustic wave device to generate an output at each chip time, converting the surface acoustic wave device output to a digital value, adding the digital values to a previously stored digital value representative of the same chip time within a sequence group in an adder, storing the added digital values in a shift register, recirculating the contents of said shift register back to the input of the adder to provide the previously stored digital values, repeating the step of adding the digital values to a previously stored digital value a predetermined number of times, and detecting the chip position in said sequence group indicative of the largest digital value stored where the unique chip position is indicative of said unique multibit data word.

8. The method set forth in claim 7 which further includes the step of reducing the recirculated contents of said shift register by a predetermined factor to normalize the recirculated digital values.

* * * * *